July 20, 1943.    L. P. YOUNG    2,324,973
SOLDERING DEVICE
Filed May 16, 1940    2 Sheets-Sheet 1
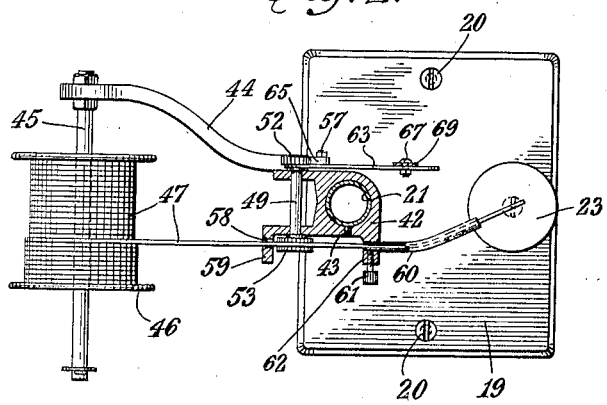
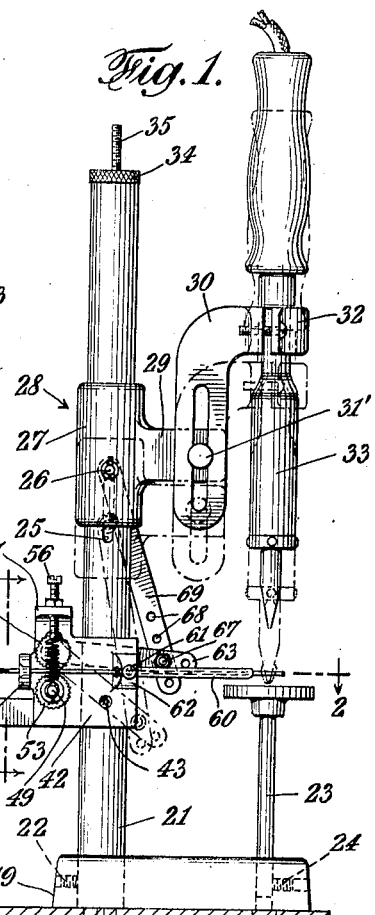
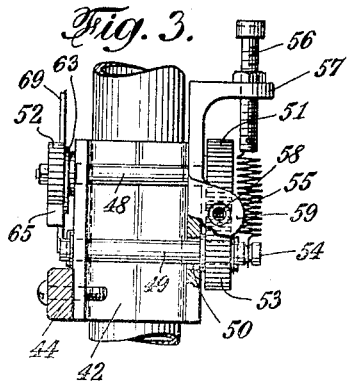
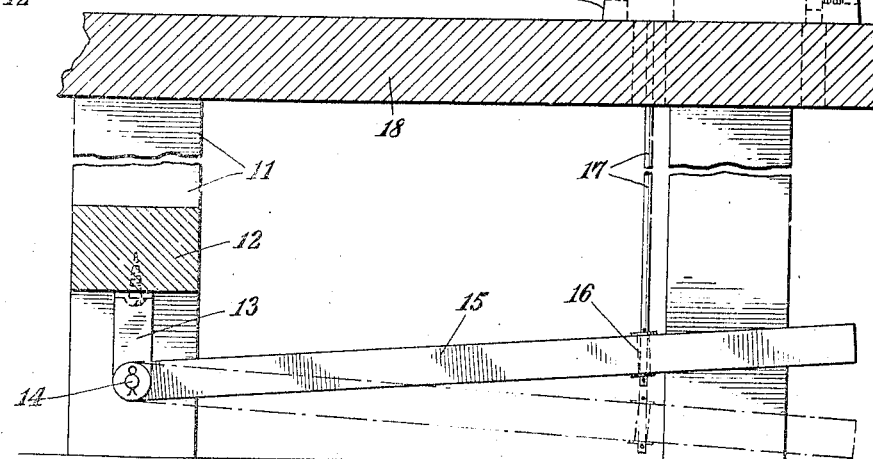
INVENTOR,
Leonard P. Young.
BY
his Attorney.

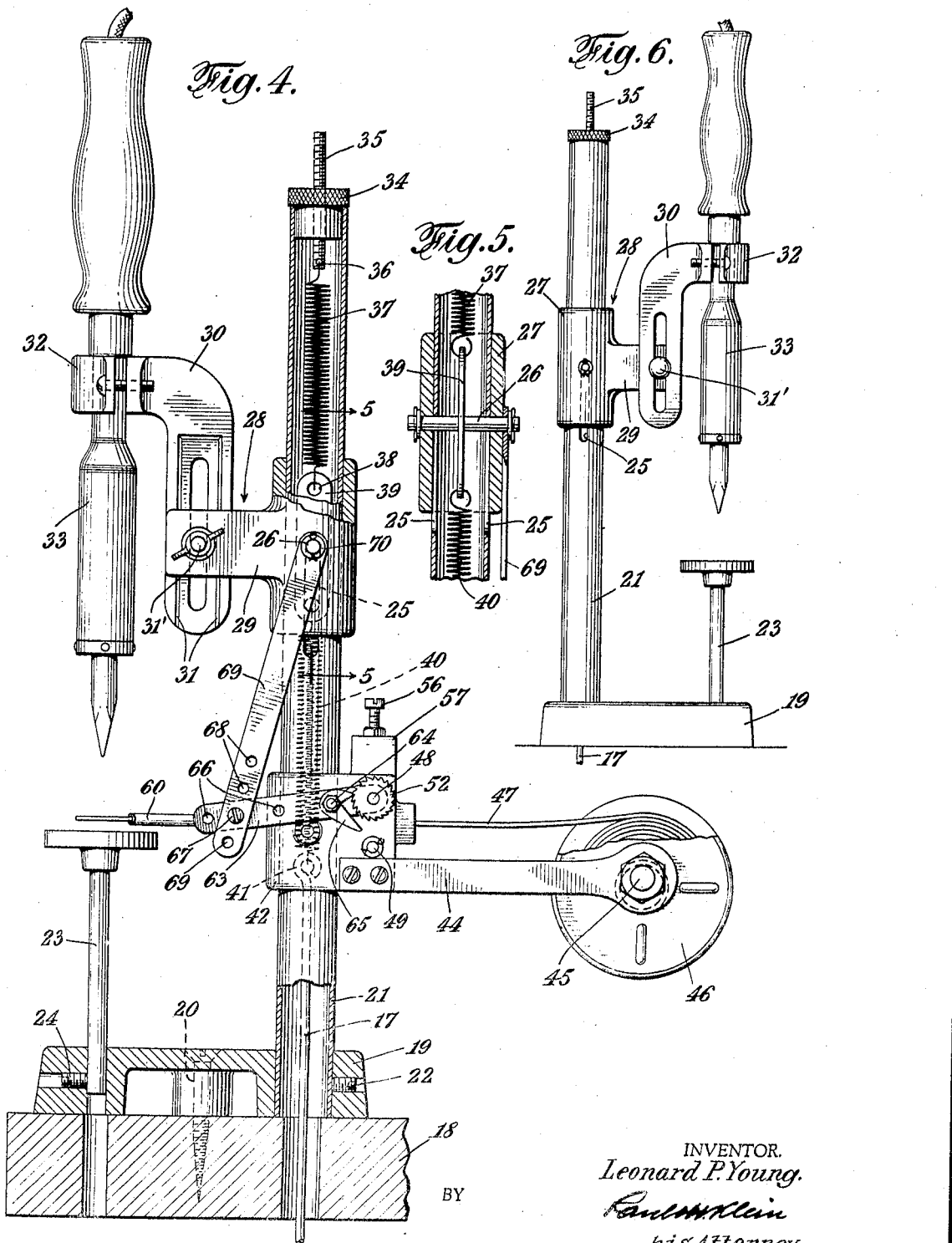

Patented July 20, 1943

2,324,973

UNITED STATES PATENT OFFICE 2,324,973

SOLDERING DEVICE

Leonard P. Young, Chester, Conn.

Application May 16, 1940, Serial No. 335,447

6 Claims. (Cl. 113—94)

This invention relates broadly to soldering devices, and particularly to the kind having a solder feeder, and which may be termed automatic.

Soldering devices provided with means for automatically feeding solder into the path of a soldering iron, and upon the work to be soldered, have been developed to a more or less crude state, but never have been found to be sufficiently practical to warrant their adoption in industry.

The present invention is primarily designed to provide a relatively simple, inexpensive and highly efficient device of that kind, which will permit continuous soldering operations, while leaving the hands of the operator free.

One of the important objects of the present invention is to provide an automatic soldering device, wherein the solder, in the form of a ribbon, cord or strip, is automatically fed over the work and into the path of a soldering iron at the time when the soldering iron moves away from the work, so that the solder is in place and at a standstill when the soldering iron is applied.

Another object of this invention is to provide in a soldering iron device of this type means for reducing the speed of a descending soldering iron and for cushioning the impact of the iron when coming in contact with the work, by interposing yieldable means between the operative means for holding the soldering iron, and the mechanism for moving the soldering iron to its work-engaging position.

The foregoing and other important objects and advantages of the present invention will become more fully apparent from the ensuing description of the accompanying drawings, in which Fig. 1 is a side elevation of my device, secured to a device support, the latter being shown partially in section;

Fig. 2 is a sectional view through my device taken on line 2—2 of Fig. 1;

Fig. 3 is a partial detail view of the feeding mechanism of my device as seen in the direction 3—3 indicated in Fig. 1;

Fig. 4 is an enlarged side elevation of my device, partially in section;

Fig. 5 is a detail sectional view taken on line 5—5 of Fig. 4; and

Fig. 6 illustrates my device without its solder feeding mechanism.

Referring now specifically to the different figures, numeral 10 denotes the floor upon which rests a device support 11, which latter is provided with a brace 12 to which is secured a bracket 13. Pivoted in the bracket at 14 is a pedal 15 for operating my device by foot. In pedal 15 is operatively lodged at 16 a connecting rod 17. The device support is preferably in the form of a work bench and is provided with a top or platform 18, supporting base 19 of my machine. This base is preferably secured to the platform by means of screws 20 (Figs. 2 and 4).

Lodged in and extending upwards from the base is a hollow or tubular standard 21, preferably held against movement by set screw 22. Also mounted in the base, and being adjustable therein, is a work-rest 23, which may be held in any position by means of set screw 24. Standard 21 is provided with two aligned guide slots 25 for accommodating, guiding and limiting the movement of a pin 26, which is secured in and passes through sleeve 27 of an iron support 28. This support has an extension 29 to which is adjustably secured a bracket 30. This bracket is provided with vertical guide means 31, a wing bolt 31' for holding it in its adjusted position (see Fig. 4), and an iron clamp 32, by means of which latter an electric iron 33 of any desired size may be securely held in place in a truly vertical position. Sleeve 27, and therefore the entire iron support, including bracket 30 and iron 33, is adapted to be reciprocated in upward and downward directions in respect to standard 21. The sleeve slides upon and is guided not only by the outer surface of the standard, but also by the cooperation of guide pin 26 and guide slots 25 in which the pin operates. The pin and the slots prevent twisting of sleeve 27.

Lodged at the free end of standard 21 is an adjusting nut 34, engaging an adjusting screw 35 from which is suspended at 36 a coil spring 37. This spring normally holds iron support 28 in upward position. The lower end of the spring engages the upper eye 38 of a connecting link 39, through the center of which passes pin 26. The lower end of link 39 engages the upper end of a cushioning spring 40, to the lower end of which latter connecting rod 17 is attached at 41 (see Fig. 4).

Secured to standard 21, below iron support 28, is a feeder mounting 42, the position of which may be changed by means of a set screw 43. Extending from feeder support 42 is a bracket 44, provided with a stationary pin or shaft 45, upon which is rollably mounted a drum 46, supporting coiled-up solder 47 in wire or ribbon form.

Secured in mounting 42 are two shafts 48 and 49. Shaft 48 is lodged in fixed bearings, while one end of shaft 49 is lodged in an elongated bearing 50 (see Fig. 3). Upon shaft 48 is fixedly mounted a feed roller 51 and a ratchet wheel 52, while shaft 49 supports another feed roller 53. The end 54 of shaft 49 is notched for receiving the looped end of a tension spring 55, suspended from an adjustable screw 56, freely lodged in bracket 57 of mounting 42. Spring 55 is intended to urge feed roller 53 against feed roller 51. The amount of pressure of roller 53 against roller 51 may be regulated by adjusting screw 56.

Passing through a guide passage 58, provided in lip 59 forming part of mounting 42, is the free end of solder wire 47, which is engaged by the feed rollers 51 and 53 and is guided by means of a guide member 60, secured by set screw 61 in extension 62 of the mounting (see Fig. 2). Guide member 60 is preferably tubular and is bent to direct the solder over the work (not shown), reposing upon work-rest 23, and so that the solder extends into the path of operation of the tip of iron 33.

Pivoted upon shaft 48, between the side of mounting 42 and roller 53, is a connecting member 63, from which extends a pin 64, serving as pivot for ratchet 65 engaging ratchet wheel 52. Connecting member 63 is provided with a series of adjusting holes 66, through one of which passes a bolt or screw 67. This same bolt passes also through one of a number of adjusting holes 68 provided in another connecting member 69, which latter is pivoted at 70 to the end of guide pin 26 passing through sleeve 27.

From Fig. 2 it will be clearly observed that drum 46 carrying the solder wire may bodily move along pin or shaft 45, as well as freely rotate thereupon. This free movement of the drum is important for an uninterrupted and smooth feeding of the solder over the work.

Operation

When work is placed upon the platform of work-rest 23, the latter is adjusted to the proper height so that the solder wire will always place itself upon the area of the work to be subjected to the soldering operation. The heated electric soldering iron 33 is then brought in contact with the solder and work by the operation of pedal 15. During the downward movement of iron-rest 28, connecting member 69 will cause a downward swing of connecting member 63, during which pawl or ratchet 65 will glide freely over the teeth of ratchet wheel 52. The downward movement of iron-support 28, and therefore of iron 33, is caused by the depression of pedal 15 and the pull exerted thereby through connecting rod 17, against cushioning spring 40, suspended from the lower end of link member 39. This downward pull is exerted against the upward pull of spring 37, which latter is intended to normally lift iron-support 28 to its upward, inoperative position. The tension of spring 37 may be regulated by nut 34 and screw 35.

When pedal 15 is released, spring 37 will pull up iron-support 28, and lift electric iron 33 from the work. During this upward movement of the iron support, connecting member 69 will cause connecting member 63 to swing upwards, whereby pawl or ratchet 65, engaging ratchet wheel 62, will turn the upper feed roller 51 a certain amount, sufficient to feed a desired length of solder wire 47 over the work reposing upon the work-rest.

The amount of solder fed through the feed rollers may be regulated by, first, the positioning of mounting 42, and, second, through the proper adjustment to one another of the two connecting members 63 and 69, by means of their respective adjusting holes and connecting bolt 67.

From the foregoing it will be observed that the feeding of the solder takes place during the upward movement of the iron so that when the iron is moved into contact with the solder and work, the fed-out piece of the solder will be at rest. Cushioning spring 40, interposed between link 39 and pedal connecting rod 17, has for its purpose to not only reduce or soften the impact of the iron when coming in contact with the work, but to cushion such impact and to prevent excessive pressure of the iron tip against the work.

While only one automatic soldering device is shown placed upon the bench or device support, it is quite obvious that any number of such devices may be similarly arranged in a row or gang, and that a number of devices may be operated by one pedal movement simultaneously. This may be of particular advantage where work of the same nature and construction is to be subjected to the same type of soldering operation, and where the distance between the tip of the raised soldering iron and the work is substantially uniform. Inasmuch as such gang arrangement is quite obviously conceivable, a special illustration thereof is omitted.

Recapitulation

The outstanding features of the present invention reside in the provision of a simple, inexpensive, effective and efficient device, provided with a hollow standard wherein are mounted its combined operating means, for normally urging the iron-support in an upwards direction and for actuating it to its soldering position, said actuating means being provided with yieldable cushioning means to prevent excessive impact against and pressure upon the work. Another important feature of my device is the automatic, readily adjustable solder feeding mechanism which ejects any desired length of solder over the work during the period of the upward movement of the iron. Still another important feature of my invention is the construction of the support for the drum from which the solder is fed into the path of the soldering iron, which support is intended to provide free movement and rotation of the drum to prevent jamming, and to assure a uniform feeding operation.

While only specific structures and arrangements were illustrated and described, it is quite obvious that improvements and changes may become necessary when my device is to handle work of different types or character, and I therefore reserve for myself the right to make such changes and improvements, without departing from the broad scope of my invention, as defined in the annexed claims.

I claim:

1. In a soldering device, a fixed base, a hollow standard extending therefrom, an adjustable iron support reciprocatingly mounted with said standard, upper and lower spring means within the standard and associated with said iron support, for, respectively, urging the support upwards, and for facilitating a cushioned downward movement of the latter, of solder, and solder feeder means associated with said standard and operatively connected with said iron support by adjustable motion-transmitting means, the latter being adapted to actuate said feeder means to dispense a desired length of solder beneath said support during the upward movement of the support, and an adjustable work-rest mounted in the base and beneath said iron support.

2. In a soldering device, a base, a standard and an adjustable work-rest mounted in the base, an adjustable iron support reciprocatingly operative upon said standard, adjustable spring means associated with the standard and said support for normally urging the latter upwards, other means connected with the support for cushioning its downward movement towards said work-rest, a source of solder, a solder feeder associated with the standard, adjustable means operatively connecting the feeder with the support and adapted to actuate the feeder when the support moves upwards.

3. In a soldering device, as set forth in claim 2, said standard being tubular and being provided with guide means for said support, said support consisting of a sleeve slidable upon the standard, a guide member mounted in said sleeve and engaging the guide means in said standard, and an iron-receiving bracket adjustably secured to said sleeve and provided with an adjustable iron clamp.

4. In a soldering device, as set forth in claim 2, said standard and said iron support having guide means adapted to define and limit the movement of the support in respect to the standard.

5. In a soldering iron device, as set forth in claim 2, said solder feeder comprising a pair of feed rollers, one of the rollers being mounted on a shaft in fixed bearings, the other roller being movable and having means for urging it against the fixed roller, a ratchet wheel fixed on the shaft of the fixed roller, a weighted ratchet operatively engaging the ratchet wheel and mounted with the adjustable means connecting the feeder with the support, the setting of said adjustable means determining the degree of feeding movement of said feeder.

6. In an automatic soldering device, a device support, a base mounted thereon, a standard and an adjustable work-rest extending from the base, an adjustable iron support, provided with an adjustable iron holder, and being reciprocatingly and slidably mounted with said standard, an electric iron secured in the holder, means for guiding and limiting the movement of the iron support, adjustable, resilient means within the standard for normally urging the iron support upwards, pedal-actuated operating means for the iron support mounted in said device support, a resilient connection interposed between the iron support and said operating means, a feeder mounting removably associated with, but fixedly held upon said standard, a solder roll supporting bracket extending from said mounting and having means for accommodating and permitting a free bodily movement and free rotation of a solder roll, a solder roll suspended from said accommodating means, a solder feeder operatively lodged in said mounting and comprising a pair of feed rollers, one roller being secured to a shaft in fixed bearings, the other roller being movable, spring means urging the latter roller against the fixed roller, a ratchet wheel provided with the shaft of the fixed roller, a weighted ratchet operatively engaging the ratchet wheel, two adjustable connections pivotally secured to the feeder mounting and the iron support, the ratchet being pivotally secured to the connection of the feeder mounting, said connections being adapted to operate the solder feeder to feed solder over the work-rest during the upward movement of the support.

LEONARD P. YOUNG.